United States Patent [19]

Morgan

[11] Patent Number: 5,437,224
[45] Date of Patent: Aug. 1, 1995

[54] APPARATUS FOR ADDING, REMOVING, AND EXCHANGING MARBLING FAT WITHIN RAW MEAT

[76] Inventor: Arthur I. Morgan, 600 E. Mermaid La., Philadelphia, Pa. 19118

[21] Appl. No.: 297,882

[22] Filed: Aug. 30, 1994

[51] Int. Cl.⁶ .................. A22C 9/00; A22C 17/00; A23L 1/31; A23L 3/34
[52] U.S. Cl. ................................ 99/533; 99/487
[58] Field of Search ............... 99/487, 516, 532–536; 426/231, 264, 281, 652

[56] References Cited

U.S. PATENT DOCUMENTS

| | | |
|---|---|---|
| 1,334,694 | 3/1920 | Dufresne et al. |
| 3,091,791 | 6/1962 | Czapar, Jr. |
| 3,916,777 | 11/1975 | Earl |
| 4,778,682 | 10/1988 | Chapman |
| 5,082,678 | 1/1992 | Margolis |
| 5,250,006 | 10/1993 | Paulus |

FOREIGN PATENT DOCUMENTS

| | | |
|---|---|---|
| 685130 | 4/1964 | Canada |
| 61-158763 | 7/1986 | Japan |
| 03164130 | 7/1991 | Japan |

OTHER PUBLICATIONS

"Texas Tech Pumps the Marbling into Beef," The National Provisioner, Mar. 3, 1962, pp. 15–16.

*Primary Examiner*—Timothy F. Simone
*Attorney, Agent, or Firm*—Richard C. Litman

[57] ABSTRACT

The present invention relates to a method for the removal, addition, or exchange of marbling fat within meat pieces, an apparatus for practicing the method, and the meat product produced by practicing the method using the apparatus. The apparatus includes a reservoir tank, a temperature control for maintaining a constant, predetermined temperature within the reservoir tank, a hollow needle for piercing a raw meat workpiece, conduit for connecting the reservoir tank to the hollow needle, a reciprocating structure for reciprocating the hollow needle, a stage to hold the meat workpiece, and a die to remove fat which is adhered to the needle as the needle is reciprocated through the meat workpiece.

9 Claims, 3 Drawing Sheets

APPARATUS FOR ADDING, REMOVING, AND EXCHANGING MARBLING FAT WITHIN RAW MEAT

BACKGROUND OF THE INVENTION

The present invention relates to a method for the removal, addition, or exchange of marbling fat within meat pieces, an apparatus for practicing the method, and the meat product produced by practicing the method using the apparatus. The present invention can remove fat from meat, add fat to meat, or exchange marbling fat for another type of fat, or another material entirely.

1. FIELD OF THE INVENTION

A fundamental dichotomy exists in American dietary consumption of meat products between "healthy eating" and "good eating." On one hand, the epidemiological data linking increased blood cholesterol levels and high dietary intake of saturated fats with increased risk of heart disease has led Americans to decrease their consumption of red meats, and meat products in general. This is due mostly to the fact that hard marbling fat, present in finer cuts of beef in particular, is very high in cholesterol and saturated fats. As a result, per capita consumption of red meat in the United States has dropped steadily since 1976. On the other hand, the general public continues to associate well marbled cuts of meat with good eating quality. The present invention is aimed at solving this dilemma in which both meat vendors and meat consumers find themselves. In effect, the present invention provides both "healthy eating," and "good eating," simultaneously.

It is now widely recognized that blood cholesterol levels can be a major indicator in determining whether or not an individual will suffer from heart disease. Individuals with higher blood cholesterol levels generally have a greater risk of developing heart disease than individuals with lower levels of cholesterol. It is also believed that an individual's blood cholesterol level is influenced by a number of diverse factors, some genetic in origin, others environmental in origin. It is known, however, with certainty, that one environmental factor which affects blood cholesterol level is diet.

The major environmental factor which contributes to a relatively high blood cholesterol level is a diet high in saturated fats. A saturated fat (also called a "hard" fat) is a fat which generally has no double or triple bonds (i.e. has no points of unsaturation). It is known that animal fats are generally high in saturated fat content. These hard, saturated fats include such fatty acids as lauric acid, myristic acid, palmitic acid and stearic acid. "Soft," or unsaturated fats have not been implicated in heart disease. Some, such as linoleic acid, linolenic acid, and eicosapentaenoic acid are either essential nutrients, or are metabolic antagonists to the harmful saturated fats and sterols, including cholesterol. Other unsaturated fats, such as arachidonic and eicosatrienoic acids, are precursors of prostaglandins, which are important triggers of various human biological responses. With the exception of a trace of arachidonic acid, all of the beneficial unsaturated fatty acids listed above are almost entirely absent from the fat found within red meat. Therefore, a simple way to lower blood cholesterol levels is to limit the intake of red meat, and hence the intake of harmful fatty acids and cholesterol.

The "hard" and "soft" designation for saturated and unsaturated fats, respectively is in reference to the melting points of the different types of fat. Fats melt at sharply lower temperatures as the amount of unsaturation within the fat molecule increases. As a thumbnail rule, then, the lower the melting point of a fat, the greater its unsaturation, and therefore the lesser its health risks.

Unfortunately, many individuals are unwilling to modify their diets to reduce their intake of saturated fats. In order to significantly lower blood cholesterol levels, it is necessary to reduce the dietary intake of animal products, and red meat in particular, and to replace it with vegetable products or other meat products such as fish and poultry, which are lower in saturated fats.

Therefore, what is needed, and what the present invention addresses, is the need for control of fat composition and quantity, not merely the total elimination of fats. As noted above, a certain amount of fat within meat is necessary to give the meat good organoleptic qualities. The present invention allows the substitution of harmful saturated fats with beneficial (or at least less harmful) polyunsaturated fats. The present invention also allows for the introduction of marbling soft fat into lean pieces of meat. Also, if desired, the present invention can remove fat from a cut of meat, without putting anything in its stead. Equally important, the present invention can do all of the above without comminuting the meat, and without changing the appearance or flavor of the meat.

In regard to the animals to be consumed themselves, altering the type and distribution of fat within food animals via breeding and management is a problem which continues to plague feed-lot managers and animal breeders. While genetics does play some role in the fat content of food animals, in ruminants such as cattle, sheep and goats, it is the metabolism of the rumen organisms which ultimately controls metabolic intake. Because the rumen organisms are controlled by their own genes, their metabolic activity is genetically independent from that of the animal, It is true however, that the gross quantity of meat fat within an animal can be controlled by animal management, such as grass feeding. However, feed-lot or open range grass feeding is a low productivity practice, and the meat produced by such programs has not won high praise in the American beef market. For the present, and the foreseeable future, the grain-fed animal is the only source of tender, juicy, high value red meats. Unfortunately, such grain-fed animals are also the main source of meat marbled with hard, saturated fat.

In addition to saturated and unsaturated fats, animal fat can also be characterized by where it is found within the animal. In general, fat is found in one of two types of deposits: depot fat or marbling fat. Depot fat accumulates in thick layers outside the muscles. Marbling fat comprises thin streaks within the muscles themselves. Depot fat can be trimmed from the meat by hand, whereas marbling fat cannot.

Within the muscles, marbling fat is held as a single droplet inside a large specialized cell. These fat cells aggregate as thin streaks along small blood vessels within the muscle. Individual cells may be as large as 0.1 mm. The average size of the fat cells increases with the total fat content of the meat, and the size of the local fat accumulation.

These marbling fat cells are rather delicate, but in the raw state remain intact and separated from one another by thin cell walls formed almost entirely of proteins. However, the fat cells rupture when the meat is cooked. This empties the contents of the cell into the surrounding meat. Because most of the compounds which give meat its characteristic flavor are fat-soluble, it is the contents of the marbling fat cells that imparts to the meat its characteristic aroma and flavor.

2. DESCRIPTION OF THE PRIOR ART

Numerous methods and machines have been devised to remove fat from animal carcasses immediately following slaughter, to tenderize tough cuts of meat, and to lower the fat and cholesterol content of finished cuts of raw meat. For instance, U.S. Pat. No. 1,334,694, issued Mar. 23, 1920, to Dufresne et al, describes an apparatus to cut external fat from slaughtered animal parts. The animal parts are drawn through heated rolls, and forced over large cutting blades which remove external fat from the pieces. The fat so removed is then recovered for further processing. U.S. Pat. No. 3,091,791, issued Jun. 4, 1953 to Czaper, Jr. discloses a meat scraper for removing bone dust and fat residue from frozen meat which has been cut with a power saw. The meat scraper includes a resilient blade which will remove the offensive bone particles and other contamination from the meat, without marring the surface of the meat.

U.S. Pat. No. 3,916,777, issued Nov. 4, 1975, to Earl, describes a meat tenderizing system in which a pistol-like device having a plurality of needles is used to inject an enzyme solution into whole, dead, meat-bearing carcasses. The enzyme solution, which prevents toughening of the meat, is injected into the animal carcass immediately after the animal is killed, while the temperature of the carcass is still within body temperature range. The apparatus used to inject the solution consists of a plurality of multiple-needle injectors, and associated holding tank and pumping means, which are used to pump the enzyme solution into the slaughtered carcasses. The needles do not reciprocate, nor does the apparatus remove fat or any other substance from the carcasses.

Chapman, U.S. Pat. No. 4,778,682 (issued Oct. 18, 1988) describes a method of preparing a low-fat, low cholesterol raw meat product. The method has two steps: The first step is to expose a thin layer of meat to ultraviolet light. The second step is to comminute the meat in a chilled bowl with the addition of cold water, acid, and salt and food phosphates. A quantity of fat and cholesterol will separate from the meat emulsion and adhere to the surface of the chilled bowl. The drawback to this process is that it cannot be performed on whole roasts or cuts of meat, but can only be used to treat comminuted meats such as ground beef.

Another method to lower the fat content of ground meats is disclosed in U.S. Pat. No. 5,082,678, issued Jan. 21, 1992 to Margolis. The Margolis method consists essentially of heating a patty of ground meat to a given temperature (45° C. for ground beef patties), and applying pressure to the cooked patty to exude a quantity of fat from the patty. This reference contains no mention performing the method on a whole piece of meat, such as a roast. The Margolis patent also describes injecting a flavoring solution into meat patties after they are cooked, so as to replace the non-fat moisture and flavors which are exuded from the meat patty along with the fat.

Paulus, U.S. Pat. No. 5,250,006, issued Oct. 5, 1993, describes an apparatus for tenderizing whole cuts of meat. The apparatus includes a stage on which the meat is placed, and an array of tenderizing knives which can be embedded and removed from the meat. The spaced tenderizing knives can be easily removed from the apparatus to facilitate cleaning and to lessen the chance of accidental injury to the operator from the sharp blades. The blades are not hollow, nor are they temperature controlled in any manner.

A Canadian Patent, No. 685,130, issued Apr. 28, 1964 to Wittag, discloses an apparatus to treat the surface of meats to facilitate the adhesion of small pieces of meat to form larger pieces of meat. The apparatus strikes the meat surface with a plurality of whip-like cords. This ruptures the surface cells of the cut of meat, which releases liquids which increase adhesion of the meat pieces.

Japanese Patent J6-1158-763-A describes the removal of surface fat derived from blocks of beef or pork using sheets of material made of a hydrophobic and lipophilic material such as polypropylene. Japanese Patent JO-3164-130-A describes a meat tenderizer which has controlling means to ensure that the tenderizing blades of the tenderizer only pierce the hardest portions of the cut of meat.

A 1962 article and accompanying advertisement from The National Provisioner (Mar. 3, 1962) describes an apparatus for injecting hot fat or other liquids into whole cuts of meat to create artificial marbling. The apparatus includes a pumping unit and a four-prong injector for pumping liquids into meat. The article only describes injecting fat or other liquid into lean, well-muscled meat. There is no discussion regarding removing fat from cuts of whole meat.

None of the above references, taken alone or in any combination, is seen as teaching or suggesting the present invention.

SUMMARY OF THE INVENTION

The present invention provides a method and an apparatus for the removal, addition, or exchange of marbling fat within whole pieces of raw meat.

The subject method of fat removal from raw pieces of meat involves piercing the meat with a cold metal surface, the metal surface preferably being a needle or a blade. For fat removal purposes, the needle or blade can be solid or hollow. The relative motion of the metal surface disrupts the cell walls of the fat cells within the piece of meat. Local friction caused by the passing metal surface momentarily melts the fat released from the ruptured fat cells, and the liquid fat coats the cold metal surface. The low temperature of the metal surface causes the fat to stiffen onto the metal. The needle or blade is then withdrawn from the meat with the stiffened fat adhered to the cold metal surface thereof. The solidified fat is scraped off the metal surface, and the process repeated.

The fat momentarily melted by the passing metal surface adheres to the metal surface because the surface energy of the fat/metal interface system is less than a fat/fat or fat/aqueous interfacial surface. The decrease in the energy of the interfacial system ensures that the liquefied meat fat spontaneously adheres to the cold metal surface which pierces the meat.

In more detail, the surface tension of a liquid (amongst other factors) is often a large controlling factor in interfacial adhesivity. The surface tension of fats, in general, is very low. This low surface tension is decreased even further when trace amounts of surface active solutes (surfactants) are present in the fat. This is true of meat fats which contain free fatty acids and monoglycerides, which act as surfactants. Additionally, fat has a very low heat of fusion and heat capacity compared to the water present in the surrounding muscle cells. Both the heat of fusion and the heat capacity decrease with increasing temperature (i.e. the increased temperature caused by the friction of the passing metal surface). Therefore, the low heat of fusion and low heat capacity of the fat compared to the water will cause the fat to melt when the metal surface passes. Upon melting, the very low surface tension of the fat compared to the free water in the surrounding muscle will cause the fat to spontaneously wet and adhere to the cool metal surface, where it hardens, even though the fat is surrounded by relatively cool meat. This is possible because the cellular nature of the meat itself effectively reduces its thermal conductivity without reducing its heat capacity. In other words, the frictional heat from the passing metal surface quickly melts the fat due to the low heat of fusion of the fat and the low thermal conductivity of the meat, while the surface tension of the fat causes it to wet and adhere to the cold metal surface.

The identity of the metal which makes up the piercing means is generally not important for an effective interface between the metal and the fat because any metal surface will be wetted by a fat when the fat would otherwise be surrounded by an aqueous solution (as in the water contained in the muscle cells of the meat). The surface area of the metal surface, i.e. it's roughness, should, however, be as great as possible consistent with the need to wipe the congealed fat off the surface once it is removed from the meat. The metal should have as low a heat capacity, and as high a thermal conductivity as possible. A preferred metal is hardened and annealed Permanickel. However, any metal having a low heat capacity and a high thermal conductivity compared to water or meat can be used.

The subject method of fat addition to raw meat according to the present invention involves the flow of liquid fat (or other liquid material) from a reservoir tank, through hollow metal piercing means, and into raw meat via orifices in the metal piercing means. For fat addition purposes, the metal piercing means are preferably hollow needles or blades. The liquid to be inserted into the meat is maintained at a higher temperature than the meat itself. The motion of the metal surfaces through the meat wipes the fat into the colder meat, where it congeals. The fat streaks so made resemble the natural marbling found in meat.

A relatively small pressure on the liquid fat (or other liquid) within the reservoir tank overcomes the resistance to fat flow within the lumen of the metal piercing means. This pressure, however, is not sufficient to cause the liquid to spurt from the orifices and into the meat. In other words, the liquid being introduced into the meat is not "pumped" into the meat. When the fat reaches the orifice of the piercing means, it is wiped into the meat by the relative motion between the metal surface and the meat.

In view of the above discussion, and the detailed description which follows, it is an object of the present invention to provide a method and apparatus to convert fresh pieces of raw meat containing unwanted hard marbling fat into pieces of raw meat having much less hard marbling fat.

It is also an object of the present invention to add more marbling fat of a desired type into lean meat pieces containing too little fat.

Yet another object of the present invention is to provide a method and an apparatus to remove unwanted hard marbling fat from cuts of raw meat.

Another object of the present invention is to provide a method and apparatus for replacing hard marbling fats in raw meats with another material, preferably a soft polyunsaturated fat.

A further object of the present invention is to provide a raw meat product comprising whole pieces of raw meat whose natural content of hard marbling fat has been significantly lowered and optionally replaced by a different type of fat or other material.

DETAILED DESCRIPTION OF THE PREFERRED EMBODIMENT

Figure 1:
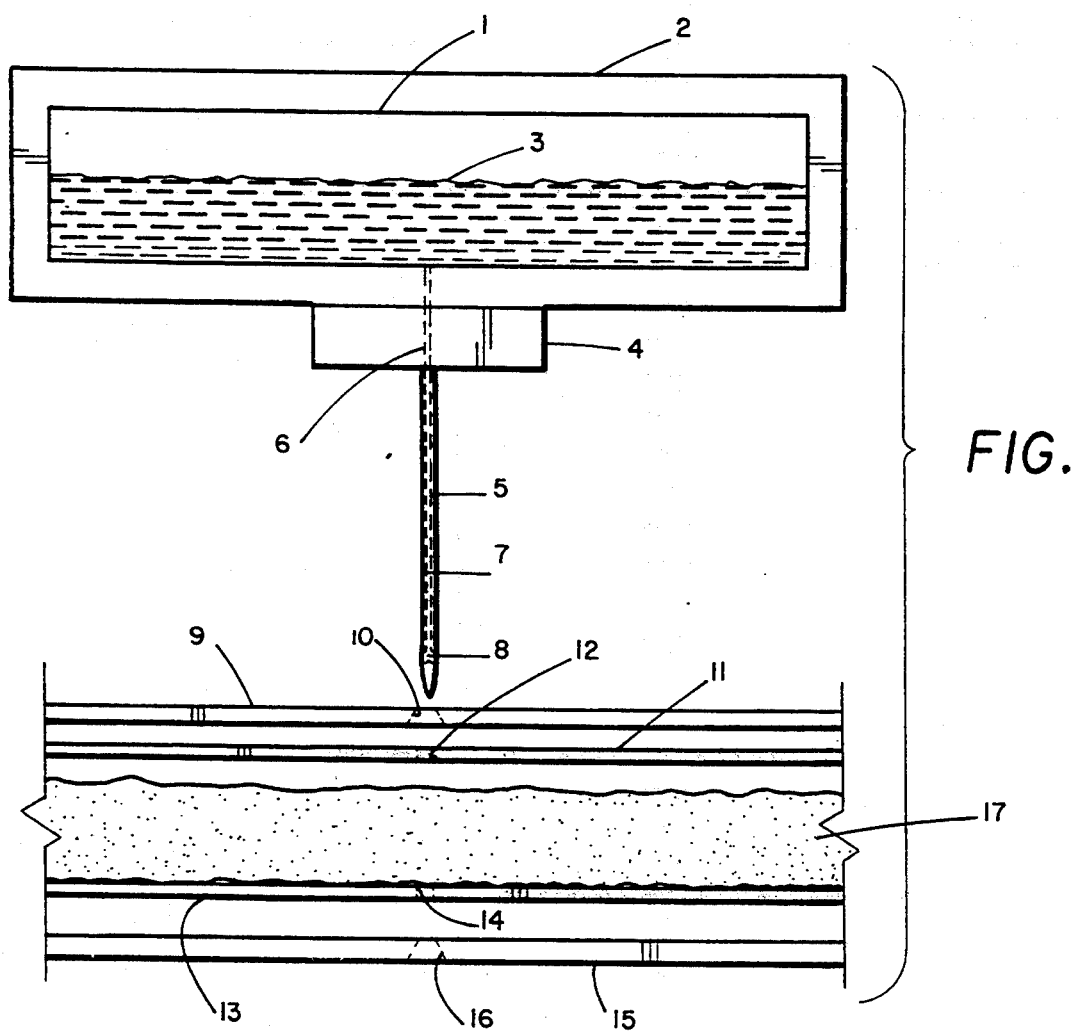
FIG. 1 is a front elevation schematic view of the present fat alteration apparatus having a single needle for the removal or addition of marbling fat to meat.

Reference is made herein to the attached drawings. The same reference numerals are used throughout the various views to indicate identical elements or features of the present invention.

FIG. 1 depicts an embodiment of the subject apparatus having a holding tank 1, filled with liquid 3, and surrounded by temperature control means 2. The temperature control means can be any type of conventional thermostated temperature control means including convective, radiative, or inductive heating coils, sleeves, blankets, etc.; refrigeration coils, etc.; or any combination thereof. Preferably the temperature control means includes both heating and cooling elements, and a thermostat to maintain the content of the reservoir at a constant temperature. Also, when the liquid 3 is not to be inserted into a meat workpiece, the liquid 3 itself may act as a temperature control, as when the liquid is a mixture of ice and water.

A piercing means 5 in the form of a hollow needle is connected to the reservoir 1. The needle is also in good thermal contact with the tank and its contents. The connection to the tank itself is such that the needle can rebound up into the tank without damage should the needle strike a solid object such as a bone. A lumen 7 is defined by the needle 5, and is connected to a conduit 6. The conduit 6 is connected to, and capable of transporting liquid 3 from the reservoir 1, to the lumen 7. Valve means, not shown, allow the conduit 6 to be closed, prohibiting liquid flow from the reservoir to the lumen. An opening, or eye 8 is located at the sharp end of needle 5, and in communication with lumen 7 to allow liquid to flow out of the needle and into a raw meat workpiece.

Reciprocating structure 4 is provided to induce a reciprocating translational motion to the needle 5. The stroke of the reciprocating motion is long enough to force the needle into a raw meat workpiece 17 placed on stage 13, and withdraw the needle completely from the raw meat workpiece. The reciprocating structure 4 can be an eccentric on a rotating cam shaft, a hydraulic piston, an air-pressure activated piston, or any other conventional assembly for imparting reciprocal motion to a shaft. It is preferred that the reciprocating structure 4 provide a constant or as near as constant velocity of the needle 5 through the meat 17. For this reason, the preferred reciprocating structure is a direct drive hydraulic piston.

The stage 13 on which the workpiece rests includes an opening or hole 14 therethrough. The opening 14 is in registration with the needle 5 so as to allow the needle to pass through the opening as the needle goes through the stroke of its reciprocating motion. Directly below the stage 13 is a lower die 15 including a hole 16 therethrough. The hole 16 is in registration with the opening 14, which, as noted above, is in registration with the needle 5. The hole 16 in lower die 15 is capable of scraping fat or other material from the surface of the needle 5. Therefore, the inside diameter of the hole 16 should be only slightly larger than the outside diameter of the needle 5. The lower die 15 also serves as a lower fat tray to capture fat removed from the meat. The lower die may optionally include channels (not shown) adjacent the hole 16 to direct the collected fat to a holding tank (not shown).

Directly above the meat is an upper die 9, and a fat tray 11. Both the upper die and the fat tray having openings or holes therethrough, 10 and 12, respectively. These openings are also in registration with the needle 5. The hole 10 in upper die 9 is identical to hole 16 in lower die 15, and functions in the same manner to remove fat adhered to the surface of the needle 5. The function of the fat tray 11 is to capture fat removed on the upstroke of the needle as it is removed from the meat, to keep the fat from falling back onto the meat. Fat remaining on the needle after the upstroke may be further removed as the needle passes through hole 10, in which case the upper die 9 will function to collect fat in the same manner as the lower die 15. As mentioned above for the lower die 15, both the upper die 9 and the fat tray 11 may have channels therein, not shown, to direct fat away from the meat workpiece and to collect it in a holding tank, not shown.

The stage, dies, and fat trays may be made of any suitably rigid material such as sheet or cast metal or a plastic resin.

Figure 2:
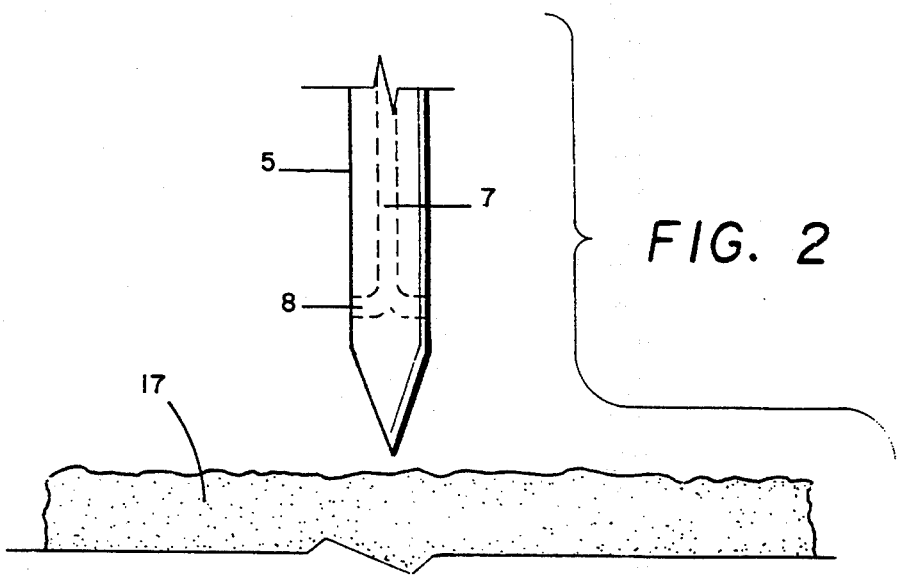
FIG. 2 is a magnified schematic view of the needle 5 shown in FIG. 1, detailing the eye and lumen of the needle.

FIG. 2 depicts a magnified view of the needle 5 of FIG. 1, showing the detail of the lumen 7 and the eyes 8. The needle may include two opposed eyes, as shown, or may include a plurality of eyes spaced along the length of the needle, in any desired configuration. This allows for flexibility in working with a wide variety of meat pieces. For instance, if large, lean pieces of meat were to have marbling fat inserted therein, a needle having many eyes spaced along the length of the needle would make the fat insertion process faster and more efficient. Very thin or delicate meat pieces may only require a needle having a single eye for fat delivery.

Figure 3:
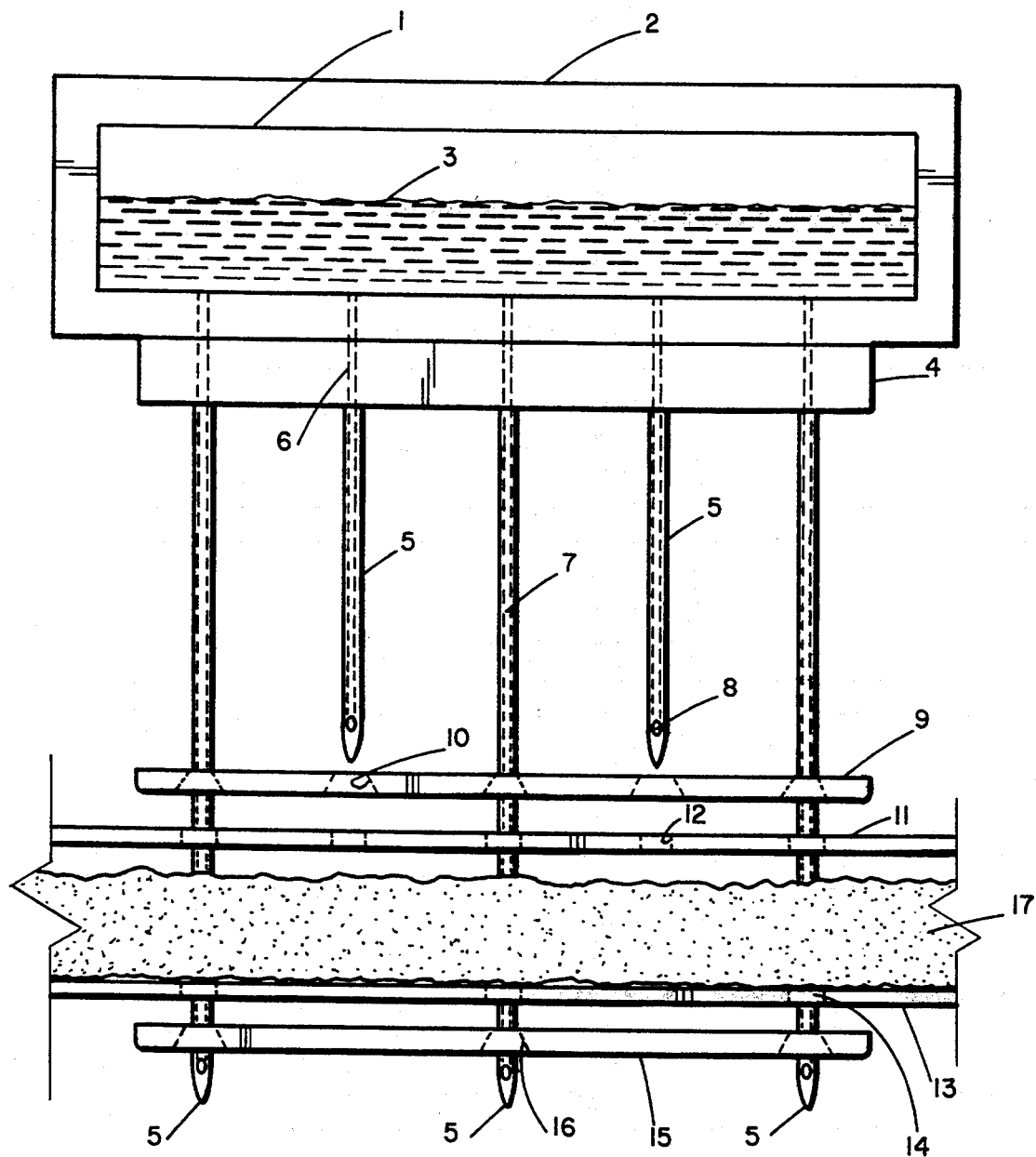
FIG. 3 is a front elevation schematic view of the present fat alteration apparatus including a plurality of needles for the removal or addition of marbling fat to meat.

FIG. 3 depicts an embodiment of the present invention including a plurality of needles 5. This embodiment of the invention is identical to the embodiment depicted in FIG. 1 with duplication of the meat-piercing mechanism. The reciprocating structure 4, of course, accommodates the added piercing needles. While the reciprocating structure may be configured to insert all of the needles into the piece of meat simultaneously, it is preferred that the reciprocating structure alternately insert groups of needles into the meat workpiece, as shown. This alternating reciprocating motion prevents the meat 17 from being lifted off the stage 15 by the friction of the needles. Upper and lower dies 9 and 15 include a plurality of openings or holes therethrough, 10 and 16, respectively, in registration with the plurality of needles 5. The fat tray 11 likewise includes a plurality of openings or holes therethrough 12. These openings are also in registration with the needles.

Figure 4:
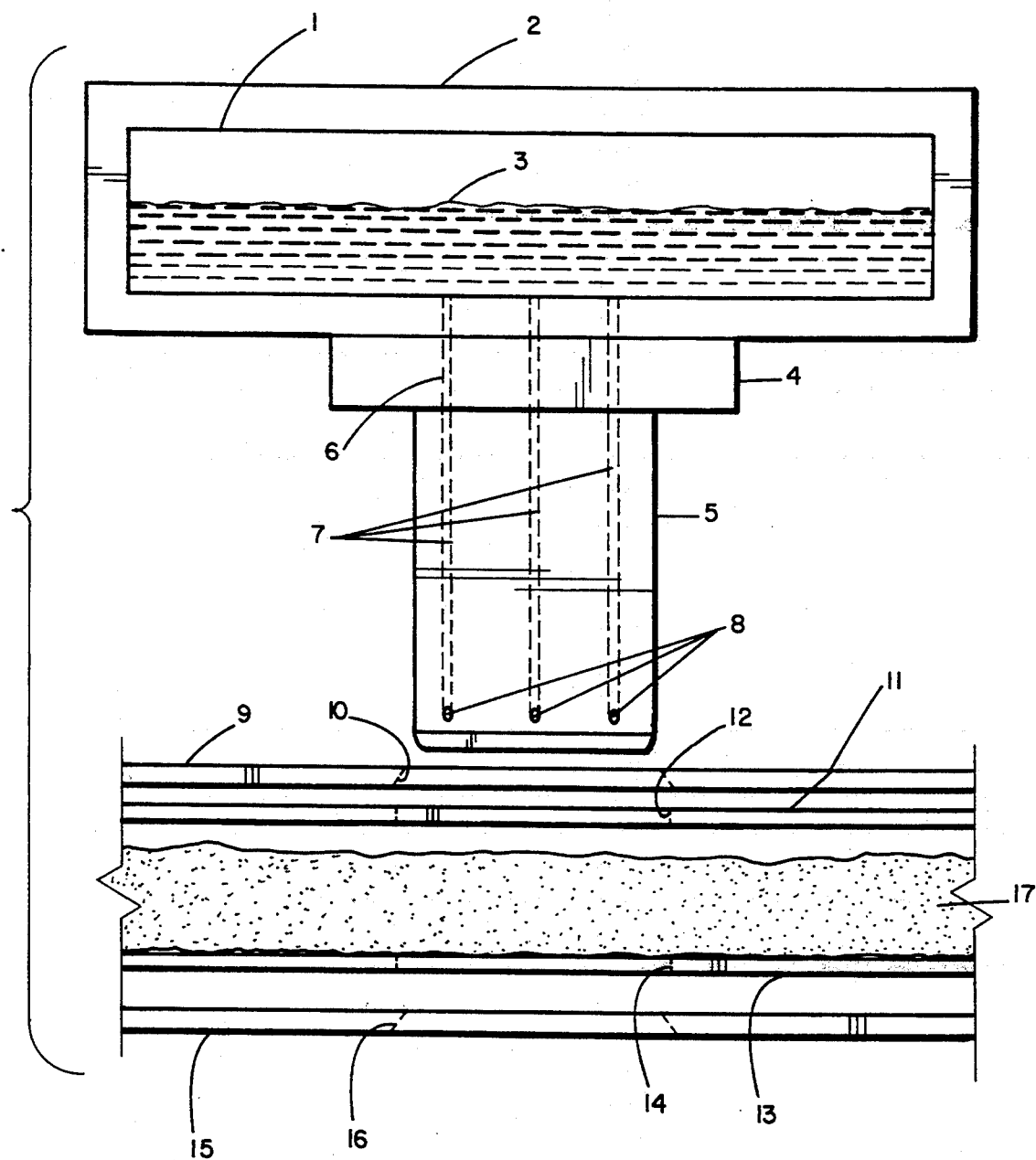
FIG. 4 is a side elevation schematic of the present fat alteration apparatus having a plurality of blades, rather than needles, for the removal or addition of marbling fat to meat.

FIG. 4 depicts another embodiment of the present invention in which the meat piercing means are no longer needles, but blades 5. As with the needles discussed above, the blades include lumens running therethrough 7, and eyes 8. The blade can include as many or as few lumens and eyes as necessary to inject marbling fat into a meat workpiece in a timely and efficient manner. Additionally, the eyes 8 may be located at any position along the length of the blade. In all other respects, the embodiment shown in FIG. 4 is identical to the embodiment depicted in FIG. 3.

In regard to the piercing means 5, be they needles or blades, they can be made of any sufficiently rigid metal having good thermal conductivity. A preferred metal is Permanickel alloy. The surface of the piercing means should be as rough as possible, consistent with the need for the dies 9 and 15 to remove fat adhered to the piercing means. The overall configuration of the piercing means may be acicular, saggitate, lanciform, hastate, ensate, ensiform, spindle-shaped, star-shaped, or any suitable configuration for piercing a raw meat workpiece. The holes 10 and 16 in dies 9 and 15 must, of course, be complementary to the configuration of the piercing means 5.

In operation, fat is removed from a piece of meat by first placing the meat on the stage 11. The reservoir 1 is then maintained at a constant temperature below the temperature of the meat workpiece, and preferably at or below 0° C. This can be done using temperature control means 2, or by placing ice water 3 inside the reservoir. The machine is then activated.

The reciprocating piercing means will be forced through the meat work piece, and through dies 9 and 15. Fat which congeals on the cold piercing means will be removed therefrom by the dies. The meat workpiece can be agitated during the process, or the process can be paused, the meat workpiece rotated or flipped, and the process resumed. The process continues until the desired amount of fat has been removed from meat.

To add fat, or any other liquid material to a meat workpiece, the reservoir 3 is filled with the liquid material to be injected. The reservoir is then heated via temperature control means 2 to a desired temperature, a temperature preferably warmer than the piece of meat to be treated. The meat work piece is then placed on the stage 11 and the apparatus activated. When the desired amount of liquid material has been added to the meat, the apparatus is deactivated, and the meat removed.

The meat treated by either of the above methods can be prepared in the same fashion as untreated meat. The treated meat product in which liquid fat has been added appears as naturally marbled meat due to the streaky nature in which the needles deposit the fat into the meat. Because the fat is not "pumped" into the meat, but is drawn out of the needles by the relative motion between the meat workpiece and the needles, the fat introduced into the meat accurately duplicates natural marbling. In all other respects, the finished product resembles untreated meat.

EXAMPLES

The following examples are for illustration purposes only, and are not to be construed as limiting the claimed invention in any manner.

EXAMPLE 1

A piece of fresh, raw, marbled, USDA choice, chuck blade roast steer beef, 20 mm thick, was treated at 20° C. in the apparatus depicted in FIG. 1. The needle used in the apparatus was 60 mm long, and 1.5 mm in diameter, and maintained at a temperature of 0° C. by ice water placed in the holding tank.

The stroke of the needle was set at 50 mm, with a stroke rate of 120 strokes per minute. The stroke length caused the needle to ascend approximately 25 mm above upper top surface of the meat, and to descend through the meat to a point approximately 5 mm below the lower surface of the meat. The maximum needle velocity was approximately 12 meters per minute. The meat was agitated slightly between needle strokes.

The needle removed 80 mg of fat per minute from the meat. The initial fat content of the meat was 30% by weight. After 1 minute of treatment, the fat content was lowered to 5% by weight. In terms of caloric content due to fat, a reduction of from 81% calories due to fat to 43% calories due to fat was achieved.

In 1 minute, 82% of the fat within 4 needle diameters of the needle had been removed. The agitation of the meat between strokes resulted in penetrations approximately 6 mm apart, on center. This large degree of fat removal is surprising because it shows that fat cells several layers away from the needle are being ruptured by the needle's passage. Using these data, to achieve quick and efficient fat removal from large pieces of meat, the needles of the apparatus should be spaced 6 mm apart on centers, in staggered rows.

The final appearance of the meat remained unchanged after the process, except for the disappearance of much of the marbling. The meat was roasted in standard fashion. The texture and flavor of the roast was judged good, although noticeably leaner and tougher than an untreated roasted control piece.

EXAMPLE 2

A piece of fresh, raw, lean, USDA good, chuck arm steer beef, 20 mm thick, was treated at 20° C. in the device shown in FIG. 1. As in Example 1, the needle was 1.5 mm in diameter, and 60 mm long. The eye of the needle was 0.3 mm in diameter, 3 mm from the needle point. The eye of the needle was in contact with the needle lumen, which was approximately 0.5 mm in diameter, and extended 57 mm from the eye of the needle to the oil reservoir.

The oil reservoir was filled with corn oil, and maintained at a constant temperature of 50° C.

The stroke of the needle was set at 50 mm, with a stroke rate of 120 strokes per minute. The stroke length caused the needle to ascend approximately 25 mm above upper top surface of the meat, and to descend through the meat to a point approximately 5 mm below the lower surface of the meat. The maximum needle velocity was approximately 12 meters per minute. The meat was agitated slightly between needle strokes.

The needle delivered approximately 0.01 grams of oil per minute into the meat. The initial fat content of the meat was 5% by weight. After one minute, fat content within four needle diameters of the needle was 9%.

The raw appearance of the meat remained unchanged after the treatment, although it appeared more moist. The meat was then boiled. Its cooked appearance was identical to an untreated control piece from the same cut which had been boiled under identical conditions. Taste tests revealed the treated meat to be more tender, juicy, and flavorful that the untreated control meat.

It is to be understood that the present invention is not limited to the embodiments or examples described above, but encompasses any and all embodiments within the scope of the following claims.

I claim:

1. An apparatus for altering fat content within raw meat comprising:
    a reservoir tank;
    temperature control means for maintaining a constant, predetermined temperature within said reservoir tank;
    at least one hollow piercing means for piercing a raw meat workpiece, said hollow piercing means defining at least one lumen therein, and including at least one open eye communicating said at least one lumen within said hollow piercing means to space outside of said hollow piercing means;
    conduit means for connecting said reservoir tank to said lumen of said at least one hollow piercing means;
    reciprocating means for reciprocating said at least one hollow piercing means;
    a stage having at least one opening therethrough, said at least one opening in registration with said at least one hollow piercing means;
    at least one die having at least one hole therethrough, said at least one hole in registration with said at least one hollow piercing means and said at least one opening of said stage, said at least one hole capable of removing stiffened material adhered to a surface of said at least one piercing means.

2. The apparatus according to claim 1, further comprising at least one fat tray having at least one aperture therethrough, said aperture in registration with said at least one hollow piercing means.

3. The apparatus according to claim 2, wherein said at least one hollow piercing means is a plurality of hollow piercing means, and wherein said at least one die includes a plurality of dies, said dies including a plurality of holes in registration with said plurality of hollow piercing mean, and wherein said stage further includes a plurality of openings, said openings in registration with said plurality of hollow piercing means.

4. The apparatus according to claim 3, wherein said at least one fat tray is a plurality of fat trays.

5. The apparatus according to claim 4, wherein said reciprocating means for reciprocating said plurality of piercing means is a direct-drive hydraulic piston.

6. The apparatus according to claim 5, wherein said plurality of hollow piercing means is a plurality of hollow needles.

7. The apparatus according to claim 6, wherein said hollow needles are made of Permanickel alloy.

8. The apparatus according to claim 5, wherein said plurality of hollow piercing means is a plurality of hollow blades.

9. The apparatus according to claim 8, wherein said plurality of blades are made of Permanickel alloy.

* * * * *